(12) United States Patent
Tamaru et al.

(10) Patent No.: US 11,822,743 B2
(45) Date of Patent: Nov. 21, 2023

(54) TOUCH PANEL INFORMATION TERMINAL APPARATUS AND INFORMATION INPUT PROCESSING METHOD IMPLEMENTED WITH DUAL INPUT DEVICES ARRANGED ON TWO SURFACES

(71) Applicant: Nippon Telegraph and Telephone Corporation, Tokyo (JP)

(72) Inventors: Masaya Tamaru, Musashino (JP); Shinichiro Eitoku, Musashino (JP); Akira Suzuki, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/616,445

(22) PCT Filed: Jun. 12, 2019

(86) PCT No.: PCT/JP2019/023351
§ 371 (c)(1),
(2) Date: Dec. 3, 2021

(87) PCT Pub. No.: WO2020/250352
PCT Pub. Date: Dec. 17, 2020

(65) Prior Publication Data
US 2022/0236852 A1 Jul. 28, 2022

(51) Int. Cl.
*G06F 3/041* (2006.01)
*G06F 3/0488* (2022.01)

(52) U.S. Cl.
CPC ........ *G06F 3/04166* (2019.05); *G06F 3/0412* (2013.01); *G06F 3/0488* (2013.01); *G06F 2203/04104* (2013.01)

(58) Field of Classification Search
CPC .. G06F 3/04166; G06F 3/0412; G06F 3/0488; G06F 2203/04104; G06F 2203/04808; G06F 3/041
See application file for complete search history.

(56) References Cited

U.S. PATENT DOCUMENTS

| 9,591,122 | B2* | 3/2017 | Yoon | G06F 3/04883 |
| 2011/0163986 | A1* | 7/2011 | Lee | H04M 1/72427 345/173 |
| 2013/0033453 | A1* | 2/2013 | Liu | G06F 3/04883 345/174 |
| 2014/0232653 | A1* | 8/2014 | Yagihashi | G06F 3/04812 345/157 |

(Continued)

FOREIGN PATENT DOCUMENTS

| JP | 2012247921 | 12/2012 |
| JP | 2016038609 | 3/2016 |

*Primary Examiner* — David D Davis
(74) *Attorney, Agent, or Firm* — Fish & Richardson P.C.

(57) ABSTRACT

A user interface unit having first and second input devices arranged on both surfaces of a display device is provided. The hardware processor of a terminal apparatus body determines whether a touch operation has been performed on only one of the first and second input devices or has been simultaneously performed on both the first and second input devices on the basis of respective detection signals output from the first and second input devices, and selectively performs the first processing and the second processing according to a determination result.

6 Claims, 9 Drawing Sheets

(56) References Cited

U.S. PATENT DOCUMENTS

| | | | |
|---|---|---|---|
| 2015/0205486 A1* | 7/2015 | Ohbitsu | G06F 3/0416 |
| | | | 715/801 |
| 2017/0139496 A1* | 5/2017 | Kang | G06F 3/0484 |
| 2019/0113995 A1* | 4/2019 | Kies | G06F 3/04883 |

* cited by examiner

TOUCH PANEL INFORMATION TERMINAL APPARATUS AND INFORMATION INPUT PROCESSING METHOD IMPLEMENTED WITH DUAL INPUT DEVICES ARRANGED ON TWO SURFACES

CROSS-REFERENCE TO RELATED APPLICATIONS

This application is a National Stage application under 35 U.S.C. §371 of International Application No. PCT/JP2019/023351, having an International Filing Date of Jun. 12, 2019, the disclosure of which is considered part of the disclosure of this application, and is incorporated in its entirety into this application.

TECHNICAL FIELD

An aspect of the present invention relates to a touch panel type information terminal apparatus including a touch panel type input interface and an information input processing method performed by the apparatus.

BACKGROUND ART

Information terminal apparatuses such as smartphones and tablet type terminals having a touch panel with an input sheet arranged on its display screen have become widespread. Such apparatuses allow an intuitive operation since an operation target can be specified by directly touching a display screen with a finger. In addition, the apparatuses have the advantage that an apparatus shape excellent in portability can be realized since the apparatuses do not require an external input device such as a mouse and a touch pad.

For example, Patent Literature 1 describes an apparatus that displays a software button (icon) or link destination information such as a Uniform Resource Locator (URL) on its display screen and recognizes the software button or the link destination information on the basis of tapped position coordinates to perform prescribed processing when an input area on an input sheet corresponding to a display area is tapped by a fingertip or the like.

CITATION LIST

Patent Literature

[PTL 1] Japanese Patent Application Laid-open No. 2016-38609

SUMMARY OF THE INVENTION

Technical Problem

However, conventional touch panel type information terminal apparatuses have a structure in which an input sheet is arranged on one surface of a display screen. Therefore, an input area by a touch operation is only an area on the single input sheet, and the number of software buttons (icons) displayable at a time is limited. Generally, one type of processing is assigned to one icon, and thus the type of specifiable processing is also limited according to the size of the input area. In order to increase the input area, the upsizing of the terminal apparatus or the downsizing of an icon is required. This results in the upsizing of the terminal apparatus or a reduction in operability.

The present invention has been made in view of the above circumstances and provides as its aspect a technology that makes it possible to specify a multiplicity of processing without causing the upsizing of a terminal apparatus or a reduction in operability.

Means for Solving the Problem

A first aspect according to the present invention includes: a display device that has a first surface and a second surface arranged on a rear surface side of the first surface; a first input device that is arranged on the first surface of the display device and outputs a detection signal corresponding to a touch position according to a touch operation; a second input device that is arranged on the second surface of the display device and outputs a detection signal corresponding to a touch position according to a touch operation; and a terminal apparatus body that is connected to the display device, the first input device, and the second input device. The terminal apparatus body includes a hardware processor and a memory that stores at least a program performed by the hardware processor. The hardware processor is configured to determine whether the touch operation has been performed on only one of the first and second input devices or has been simultaneously performed on both the first and second input devices on a basis of the respective detection signals output from the first and second input devices, perform first processing on a basis of the detection signal output from an input device on which the touch operation has been performed when determining that the touch operation has been performed on only one of the first and second input devices, and perform second processing on a basis of the detection signal output from the first or second input device when determining that the touch operation has been simultaneously performed on both the first and second input devices.

Effects of the Invention

A first aspect of the present invention can provide a technology that makes it possible to specify a multiplicity of processing without causing the upsizing of a terminal apparatus or a reduction in operability.

DESCRIPTION OF EMBODIMENTS

Hereinafter, embodiments according to the present invention will be described with reference to the drawings.

Embodiment (Configuration)

Figure 1:
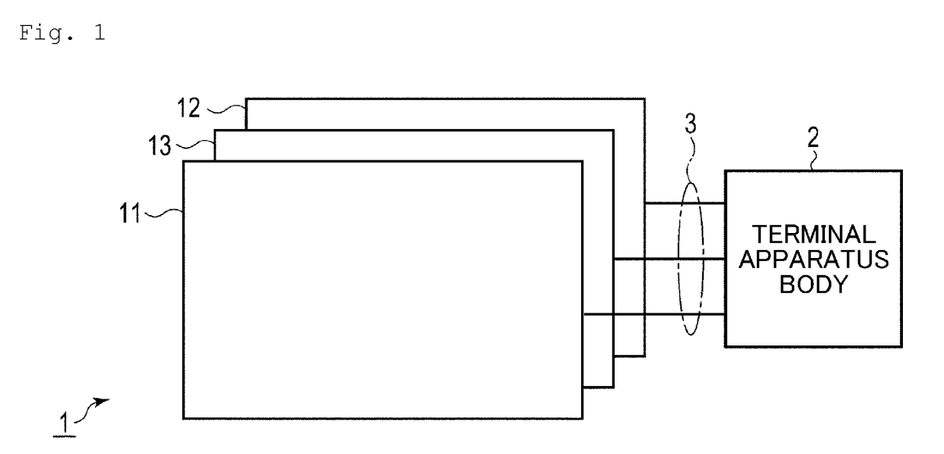
FIG. 1 is a schematic configuration view of a touch panel type information terminal apparatus according to an embodiment of the present invention.

FIG. 1 is a schematic configuration view of a touch panel type information terminal apparatus according to an embodiment of the present invention. The touch panel type information terminal apparatus according to the present embodiment includes a touch panel type user interface unit 1 and a terminal apparatus body 2.

(1) User Interface Unit 1

The user interface unit 1 has a first input device 11 arranged on a first surface of a sheet-shaped display device 13 and a second input device 12 arranged on a second surface on the rear surface side of the first surface of the display device 13 and connects the display device 13 and the first and second input devices 11 and 12 to the terminal apparatus body 2 via a signal line 3. That is, the user interface unit 1 has a structure in which the display device 13 is sandwiched between the first and second input devices 11 and 12.

The display device 13 is made of a device using, for example, a liquid crystal or an organic EL and displays display data output from the terminal apparatus body 2. Note that a display device using a transparent material may be used as the display device 13. The use of such a display device makes it possible to perform, for example, an Augmented Reality (AR) display and allows a user to see through the display device 13 and confirm relevant digital information or the like so as to be superimposed on information on real space such as a surrounding scenery.

Each of the first and second input devices 11 and 12 is made of a transparent sheet-shaped device. When a touch operation is performed on its surface, each of the first and second input devices 11 and 12 detects a touch position by, for example, a capacitance method and inputs a detection signal to the terminal apparatus body 2. Note that the respective input devices 11 and 12 will also be called touch panels below. Further, as a method for detecting a touch operation, it is also possible to employ other methods such as a pressure detection method other than the capacitance method.

(2) Terminal Apparatus Body 2

Figure 2:
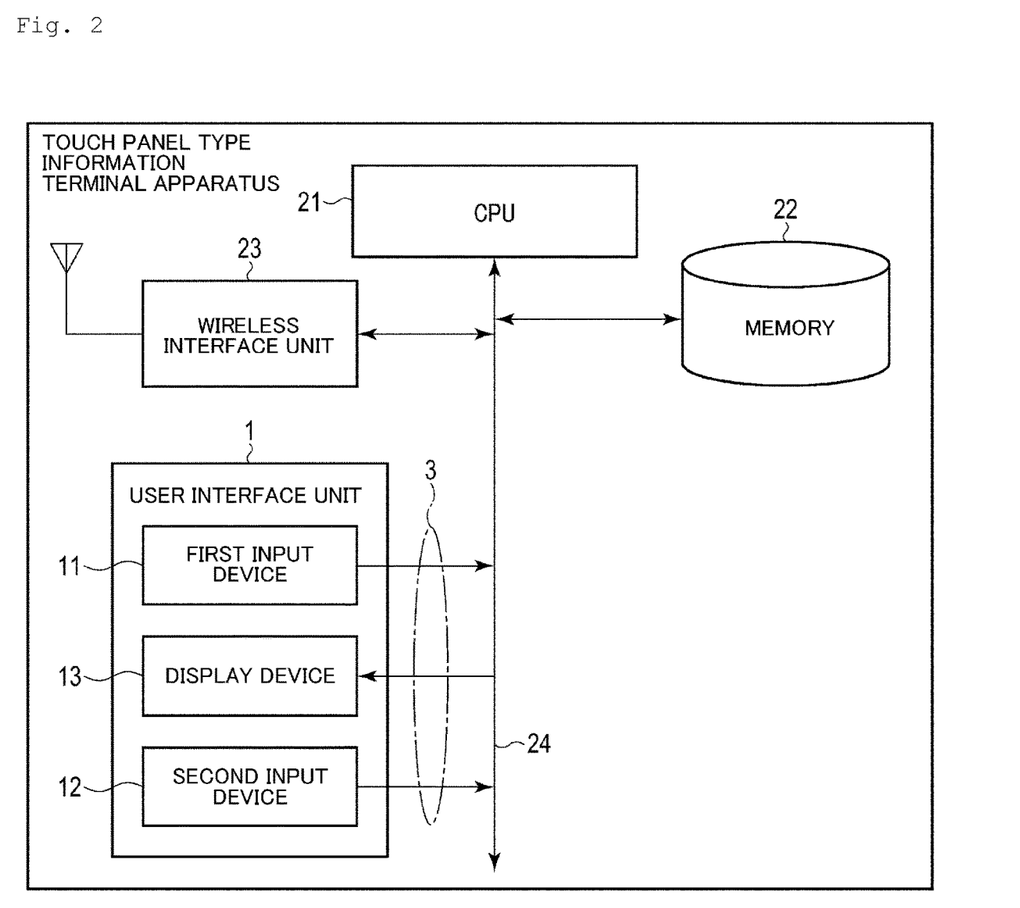
FIG. 2 is a block diagram showing the hardware configuration of the touch panel type information terminal apparatus according to an embodiment of the present invention.

FIG. 2 is a block diagram showing the hardware configuration of the terminal apparatus body 2 with the user interface unit 1.

The terminal apparatus body 2 includes a hardware processor (hereinafter also called a CPU) 21 such as a Central Processing Unit (CPU) and connects a memory 22, a wireless interface unit 23, and the user interface unit 1 to the CPU 21 via a bus 24. Note that it is also possible to connect other devices such as a camera, a microphone, and a speaker to the CPU 21.

The memory 22 uses a non-volatile memory such as a Solid State Drive (SSD) capable of performing writing and reading at any time as a storage medium and has a program storage area and a data storage area. In the program storage area, a middleware program that functions as an Operation System (OS) and various application programs are stored. In the data storage area, various data acquired and generated when the terminal apparatus body 2 performs various processing according to the present invention is stored. Note that the memory 22 may also include a Read Only Memory (ROM) or a Random Access Memory (RAM) as a storage medium.

The wireless interface unit 23 performs wireless communication with a communication partner terminal or a Web site using, for example, a mobile telephone network, a wireless Local Area Network (LAN), or a near field wireless data communication network (for example, Bluetooth™) under the control of the CPU 21.

Figure 3:
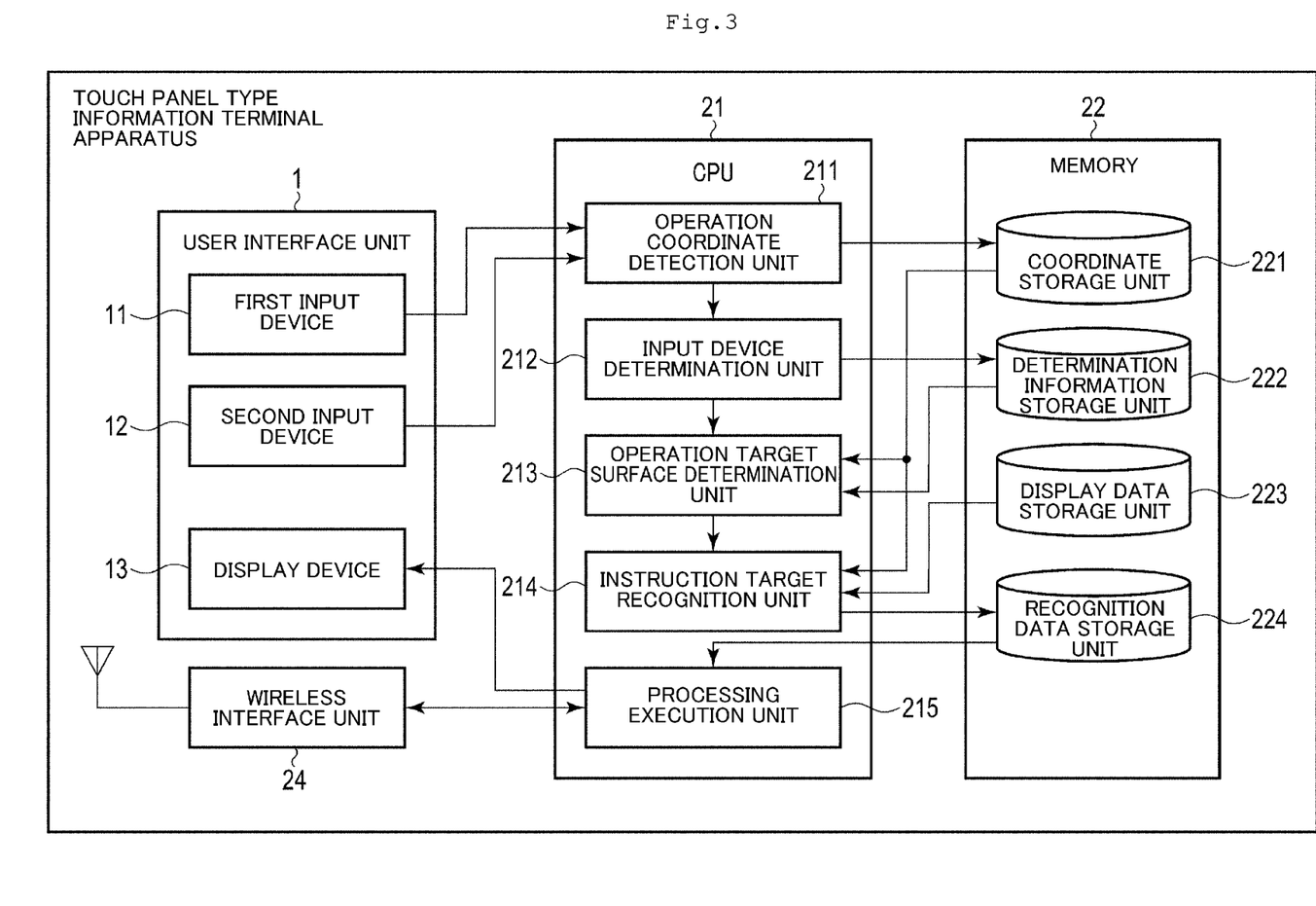
FIG. 3 is a block diagram showing the software configuration of the touch panel type information terminal apparatus according to an embodiment of the present invention.

FIG. 3 is a block diagram showing the software configuration of the terminal apparatus body 2 in association with the hardware configuration shown in FIG. 2.

In the data storage area of the memory 22, a coordinate storage unit 221, a determination information storage unit 222, a display data storage unit 223, and a recognition data storage unit 224 are provided as storage units required to perform the present embodiment. In the display data storage unit 223 among the storage units, display data that is being displayed on the display device 13 is stored. The display data contains, for example, a plurality of software buttons (for example, icons) that serve as selection candidates to be processed.

The CPU 21 has an operation coordinate detection unit 211, an input device determination unit 212, an operation target surface determination unit 213, an instruction target recognition unit 214, and a processing execution unit 215 as processing units required to perform the present embodiment. All the processing units 211 to 215 are realized when the CPU 21 is caused to perform the programs stored in the program storage area inside the memory 22.

The operation coordinate detection unit 211 imports detection signals showing a touch position from the first and second input devices 11 and 12 when the touch operation has been performed on one of or both the first and second input devices 11 and 12 of the user interface unit 1. Then, the operation coordinate detection unit 211 performs processing to detect the coordinates of the touch position on the basis of the imported detection signals and cause the coordinate storage unit 221 inside the memory 22 to store data on the position coordinate.

The input device determination unit 212 imports the detection signals from the operation coordinate detection unit 211 and determines on the basis of the detection signals whether the touch operation has been performed on only one of the first and second input devices 11 and 12 or has been simultaneously performed on both the first and second input devices 11 and 12. Then the input device determination unit 212 performs processing to cause the determination information storage unit 222 inside the memory 22 to store information showing a determination result. As the information showing the determination result, identification information on an input device from which the touch operation has been detected is, for example, used.

Note that the touch operation simultaneously performed on both the first and second input devices 11 and 12 will also be called "pinch control" since the touch operation is the operation of sandwiching or pinching the user interface unit 1 between, for example, a thumb and another finger.

The operation target surface determination unit 213 performs processing to read the position coordinates of the touch operation on the respective input devices 11 and 12 from the coordinate storage unit 221 and determine an input device that has served as an operation target surface on the basis of the position coordinates when it is determined by the input device determination unit 212 that the pinch control has been performed. The determination of an input device that has served as the operation target surface is performed by determining an input device that has been touched by, for example, a thumb.

The instruction target recognition unit 214 recognizes which software button has been instructed by the touch operation on the basis of the position coordinates of touch operations stored in the coordinate storage unit 221 and coordinates showing the display areas of a plurality of software buttons contained in the display data stored in the display data storage unit 223. Then, the instruction target recognition unit 214 performs processing to cause the recognition data storage unit 224 to store instruction target recognition data.

The processing execution unit 215 reads a corresponding application/program from the program storage area inside the memory 22 on the basis of the instruction target recognition data stored in the recognition data storage unit 224, the determination information on the input device on which the touch operation has been performed that is stored in the determination information storage unit 222, and the identification information on the input device that has been determined as the operation target surface by the operation target surface determination unit 213 and causes the CPU to perform the read application/program.

(Operation)

Figure 4:
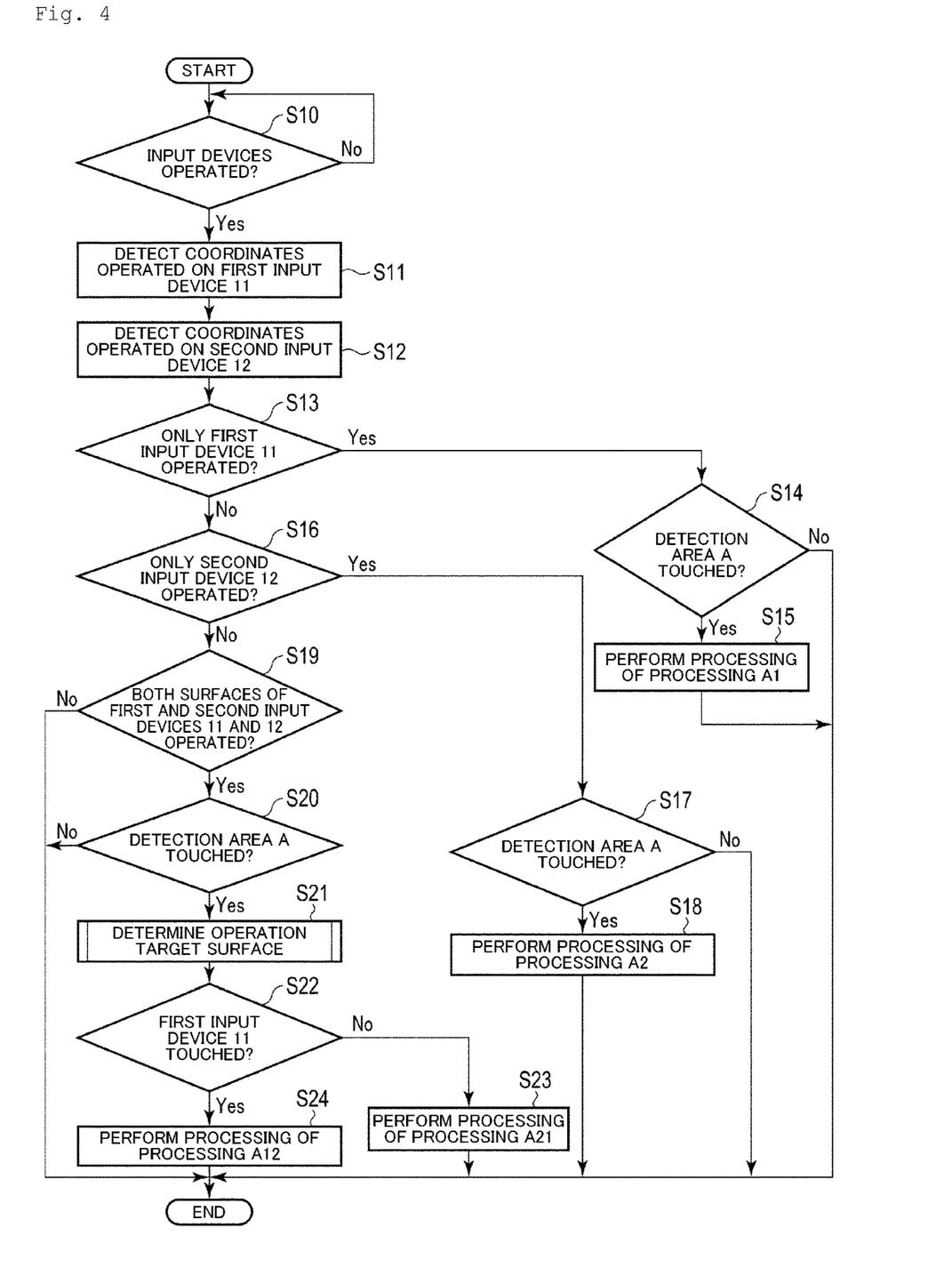
FIG. 4 is a flowchart showing a processing procedure and processing contents performed by the software of the touch panel type information terminal apparatus shown in FIG. 3.

Next, an information input processing operation by the touch panel type information terminal apparatus configured as described above will be described. FIG. 4 is a flowchart showing the whole processing procedure and processing contents.

It is assumed that a software button (icon) A corresponding to an application that is a candidate to be processed is, for example, displayed on the display device 13. Note that display data is not limited to a software button (icon) but link destination information such as a URL may be displayed. The number of icons or the like displayed simultaneously is not limited to one.

(1) When Touch Operation Has Been Performed on Only First Input Device 11

The CPU 21 monitors a touch operation on the first and second input devices (touch panels) 11 and 12 under the control of the operation coordinate detection unit 211 in step S10. It is assumed that a user has performed the touch operation on the touch panels 11 and 12 with his/her fingertips in this state.

When detecting the touch operation in step S10, the CPU 21 detects touch position coordinates on the basis of detection signals output from the first and second input devices 11 and 12 under the control of the operation coordinate detection unit 211 in steps S11 and S12. Then, the CPU 21 causes the coordinate storage unit 221 to store the detected touch position coordinates. By the processing, the touch position coordinates of one of or both the input devices 11 and 12 on which the user has performed the touch operation are obtained.

Next, the CPU 21 first determines whether the position coordinates of the touch operation have been obtained from only the first input device 11 under the control of the input device determination unit 212 in step S13. When a result of the determination shows that the position coordinates of the touch operation have been obtained from only the first input device 11, the CPU 21 determines whether the touch position coordinates that have been detected by the first input device 11 fall within a detection area corresponding to the software button (icon) A that is being displayed on the display device 13 under the control of the instruction target recognition unit 214 in step S14. Then, when the touch position coordinates fall within the detection area corresponding to the software button (icon) A, the CPU 21 selects and performs an application A1 that corresponds to the first input device 11 on which the touch operation has been performed and that corresponds to the software button (icon) A as one of first processing under the control of the processing execution unit 215 in step S15.

Note that the CPU 21 returns to a standby state for a touch operation in step S10 when the touch position coordinates do not fall within the detection area that corresponds to the software button (icon) A.

(2) When Touch Operation Has Been Performed on Only Second Input Device 12

The CPU 21 determines whether the position coordinates of the touch operation have been obtained from the second input device 12 under the control of the input device determination unit 212 in step S16 when the position coordinates of the touch operation have not been obtained from the first input device 11 in step S13.

When a result of the determination shows that the position coordinates of the touch operation have been obtained from the second input device 12, the CPU 21 determines whether the touch position coordinates that have been detected by the second input device 12 fall within the detection area corresponding to the software button (icon) A that is being displayed on the display device 13 under the control of the instruction target recognition unit 214 in step S17. A case in which the touch position coordinates fall within the detection area corresponding to the software button (icon) A will be considered. In this case, the CPU 21 selects and performs an application A2 that corresponds to the second input device 12 on which the touch operation has been performed and that corresponds to the software button (icon) A as one of the first processing under the control of the processing execution unit 215 in step S18.

Note that the CPU 21 returns to a standby state for a touch operation in step S10 when the touch position coordinates do not fall within the detection area that corresponds to the software button (icon) A.

That is, in the present embodiment, the different applications A1 and A2 are selected and performed depending on whether an input device on which a touch operation has been performed is the first input device 11 or the second input device 12 even when the same software button (icon) A has been touched and operated.

(3) When "Pinch Control" is Performed on First and Second Input Devices 11 and 12

Figure 6:
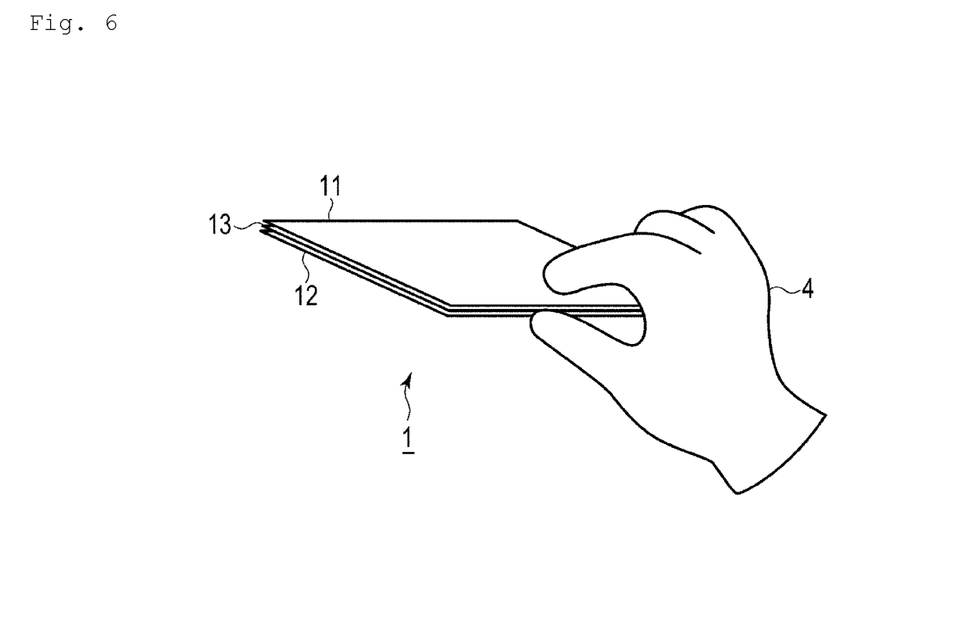
FIG. 6 is a view showing a first example of pinch control on a touch panel.

FIG. 6 is a view showing an example of the "pinch control". In this operation mode, the user interface unit 1 is touched so as to be held from its vertical direction by a thumb 41 and another finger 42 (for example, an index finger or a middle finger) of a hand 4 in a state of being set in a substantially horizontal position. In this case, there is generally a difference between a contact position 51 of the thumb 41 and a contact position 52 of the other finger 42 on the first and second input devices 11 and 12 as shown in, for example, FIG. 7. The contact position 51 of the thumb 41 gets closer to the end side of the user interface unit 1 than the contact position 52 of the other finger 42.

Figure 8:
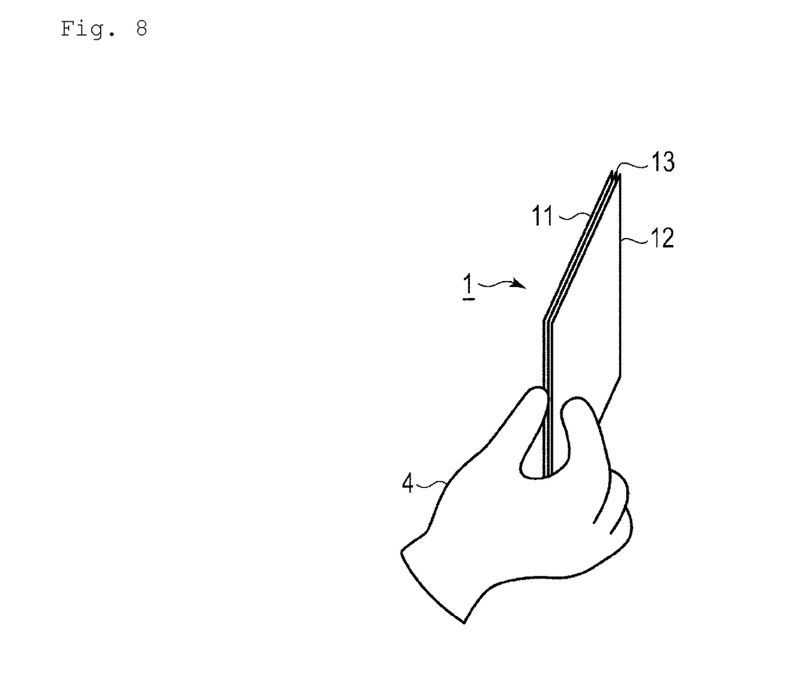
FIG. 8 is a view showing a second example of the pinch control on the touch panel.

FIG. 8 is a view showing another example of the "pinch control". In this operation mode, the user interface unit 1 is touched so as to be held on its left and right sides by a thumb 41 and another finger (for example, an index finger or a middle finger) 42 of a hand 4 in a state of being set in a substantially vertical position. In this case as well, there is generally a difference between a contact position 51 of the thumb 41 and a contact position 52 of the other finger 42 on the first and second input devices 11 and 12 as shown in, for example, FIG. 9. The contact position 51 of the thumb 41 gets closer to the end side of the user interface unit 1 than the contact position 52 of the other finger 42.

The CPU 21 determines whether the position coordinates of the touch operation have been obtained from both the first and second input devices 11 and 12 under the control of the input device determination unit 212 in step S19. A case in which it is determined that the "pinch control" has been performed when a result of the determination shows that the touch operation has been almost simultaneously performed on both the first and second input devices 11 and 12 will be considered. In this case, the CPU 21 determines whether the touch position coordinates detected by the first and second input devices 11 and 12 fall within the detection area corresponding to the software button (icon) A that is being displayed on the display device 13 under the control of the instruction target recognition unit 214 in step S20.

When a result of the determination shows that the touch position coordinates fall within the detection area corresponding to the software button (icon) A, the CPU 21 then determines which of the first and second input devices 11 and 12 serves as an operation target surface under the control of the operation target surface determination unit 213 in step S21.

Here, when a touch panel type terminal such as a smartphone is touched and operated, a user generally performs a touch operation with his/her thumb in many cases. Accordingly, when the "pinch control" is performed as well, it is recognized that a surface operated by a thumb serves as an operation target surface on which an instruction operation has been performed.

Figure 5:
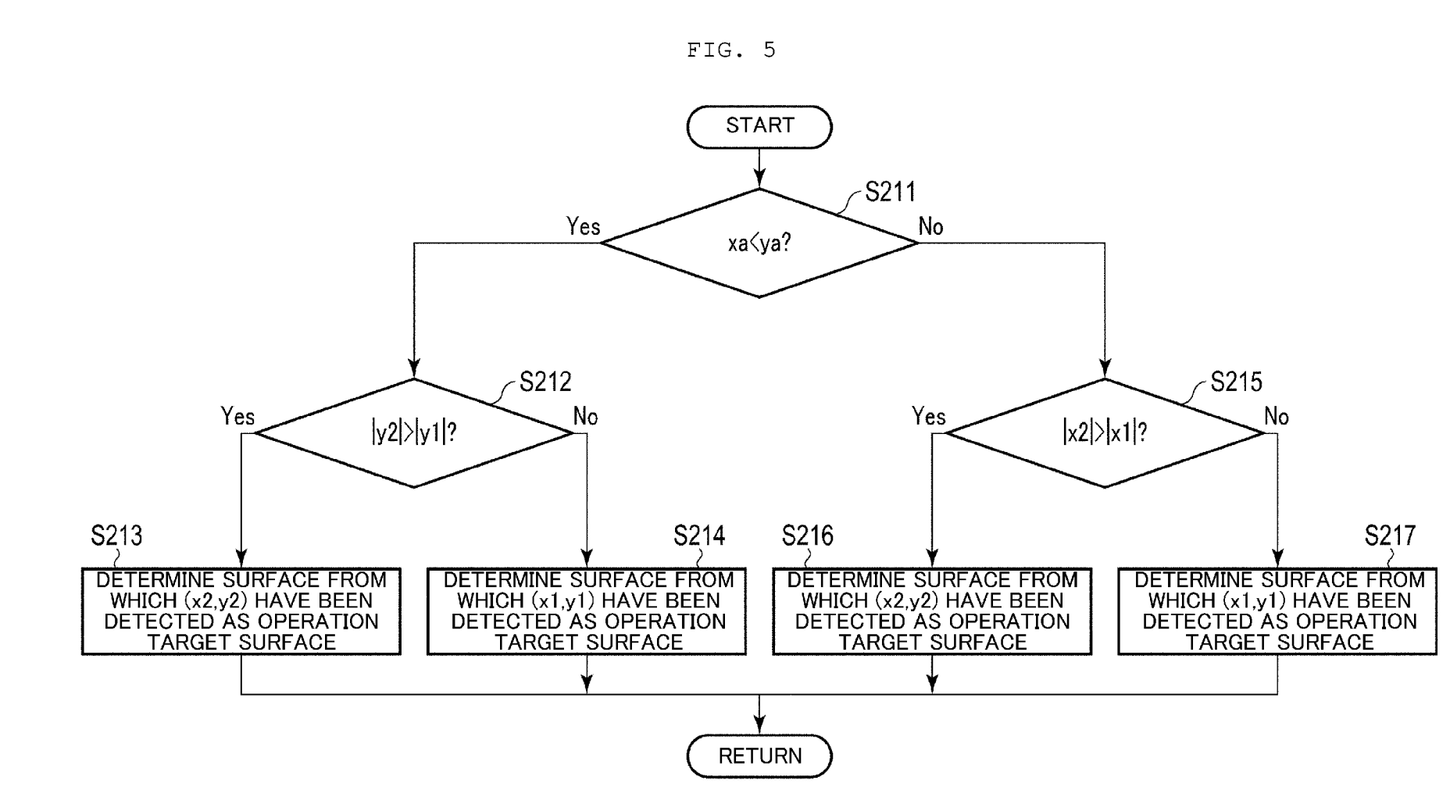
FIG. 5 is a flowchart showing an example of the processing procedure and the processing contents of operation target surface determination processing among processing shown in FIG. 4.

Hereinafter, an example of operation target surface determination processing will be described in detail. FIG. 5 is a flowchart showing a determination processing procedure and processing contents. FIGS. 10 to 13 show the assumed operation directions of the four types of the "pinch control". Further, FIG. 14 shows an operation shown in FIG. 10 in an enlarged manner.

As shown in FIGS. 10 to 13, four cases are considered when the user performs the "pinch control". A first case is a case (FIG. 10) in which a touch panel is pinched between a thumb 41 and another finger 42 on its upper end side. A second case is a case (FIG. 11) in which the touch panel is pinched between the thumb 41 and the other finger 42 on its lower end side. A third case is a case (FIG. 12) in which the touch panel is pinched between the thumb 41 and the other finger 42 on its left end side. A fourth case is a case (FIG. 13) in which the touch panel is pinched between the thumb 41 and the other finger 42 on its right end side. Note that touch position coordinates P1 and P2 of the thumb 41 and the other finger 42 are expressed as (x1, y1) and (x2, y2), respectively.

In step S211, the CPU 21 first calculates a difference (xa, ya) between touch position coordinates P1(x1, y1) of the thumb 41 and touch position coordinates P2(x2, y2) of the other finger 42 and determines whether xa<ya is established under the control of the operation target surface determination unit 213. According to the determination, it is possible to discriminate whether the "pinch control" has been performed on the upper and lower end sides or the left and right end sides.

Figure 10:
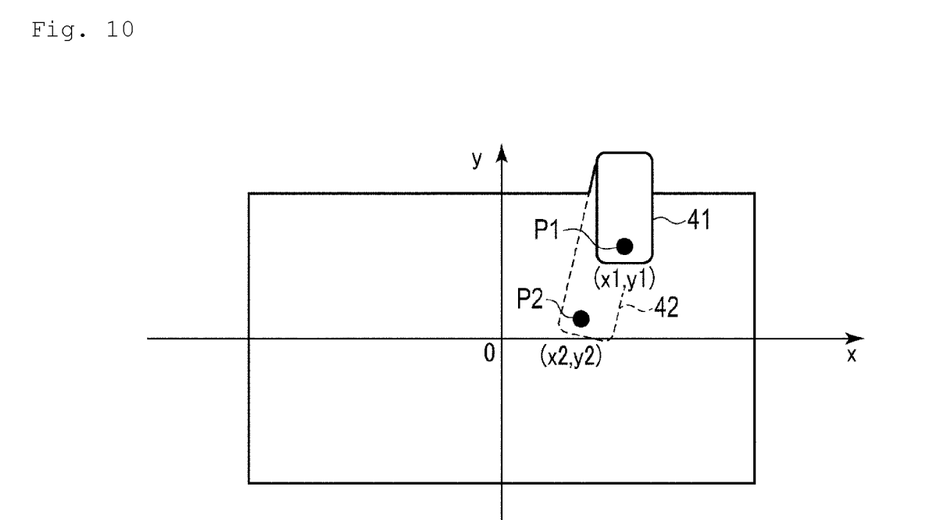
FIG. 10 is a plan view showing an example of operation positions when the pinch control has been performed on the touch panel on its upper side.
Figure 11:
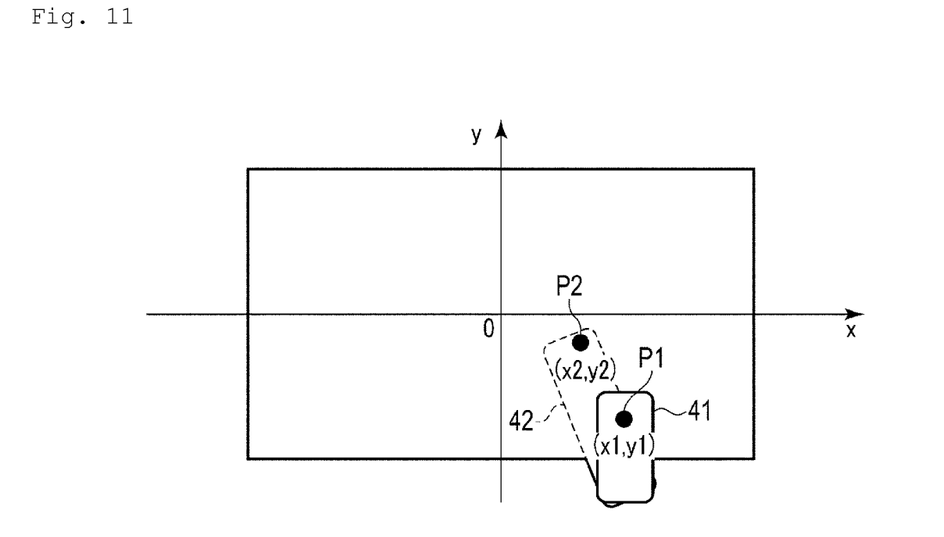
FIG. 11 is a plan view showing an example of operation positions when the pinch control has been performed on the touch panel on its lower side.

When xa<ya is determined in step S211, it is determined that the "pinch control" has been performed on the upper end side or the lower end side of the touch panel as shown in FIG. 10 or 11. In this case, the CPU 21 determines whether |y2|>|y1| is established in S212. When a result of the determination shows that |y2|<|y1| is established, the CPU 21 recognizes an input device from which the position coordinates P1(x1, y1) have been detected as an operation target surface in step S214. On the other hand, when the result of the determination shows that |y2|>|y1| is established, the CPU 21 recognizes an input device from which the position coordinates P2(x2, y2) have been detected as an operation target surface in step S213.

Figure 12:
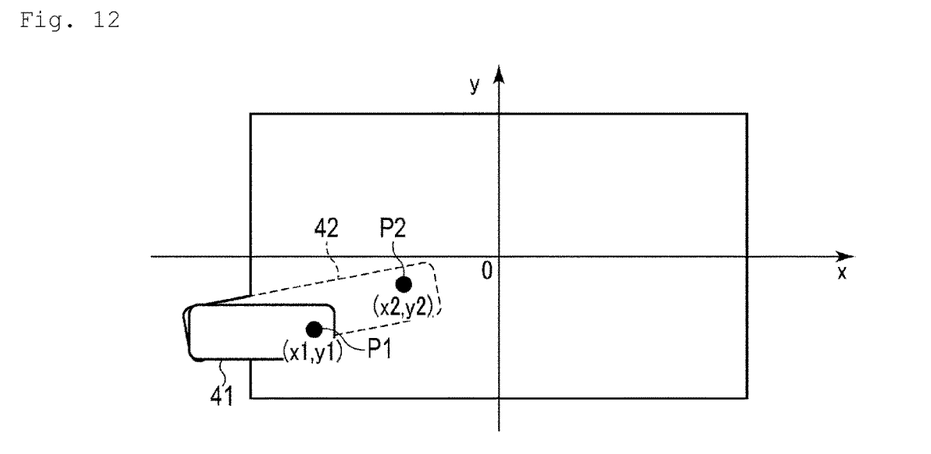
FIG. 12 is a plan view showing an example of operation oppositions when the pinch control has been performed on the touch panel on its left side.
Figure 13:
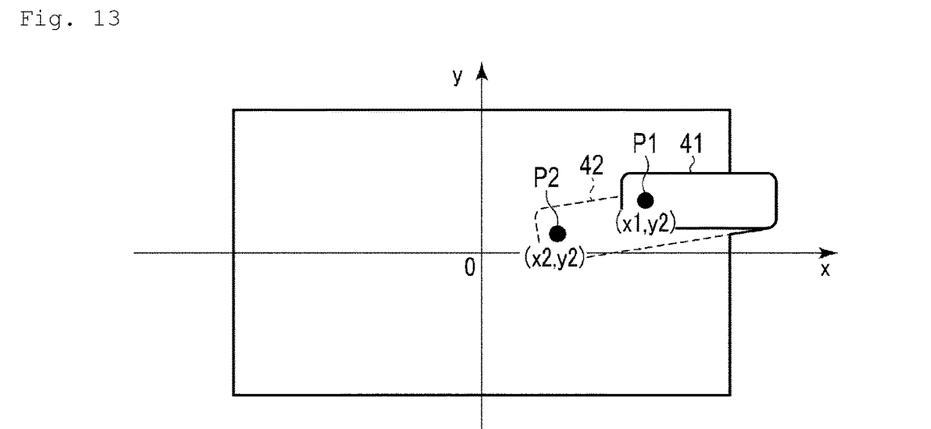
FIG. 13 is a plan view showing an example of operation oppositions when the pinch control has been performed on the touch panel on its right side.
Figure 14:
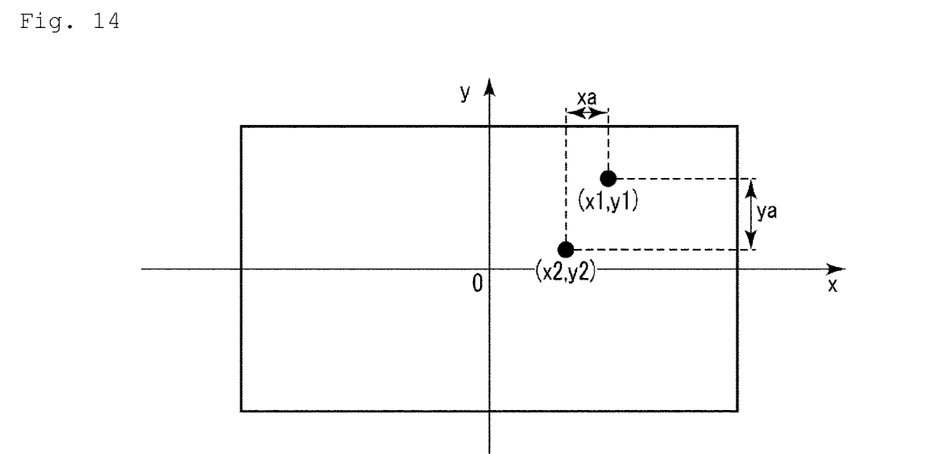
FIG. 14 is a view for describing an example of processing to determine the operation target surface of a thumb when the thumb serves as an operation finger.

On the other hand, when xa>ya is determined in step S211, it is determined that the "pinch control" has been performed on the left end side or the right end side of the touch panel as shown in FIGS. 12 and 13. In this case, the CPU 21 determines whether |x2|>|x1| is established in S215. When a result of the determination shows that |x2|<|x1| is established, the CPU 21 recognizes an input device from which the position coordinates P1(x1, y1) have been detected as an operation target surface in step S217. On the other hand, when the result of the determination shows that |x2|>|x1| is established, the CPU 21 recognizes an input device from which the position coordinates P2(x2, y2) have been detected as an operation target surface in step S216.

That is, in the operation target surface determination processing, it is determined that an input device on which the touch operation has been performed at position coordinates closer to the end of the input device 11 or 12 among the first and second input devices 11 and 12 is determined as the operation target surface, that is, an input device that serves as a target to which instructions by a touch operation are to be input.

When the operation target surface determination processing ends, the CPU 21 then determines whether an instruction target surface by the "pinch control" (an operation surface operated by a thumb) is the first input device 11 or the second input device 12 on the basis of a determination result of the operation target surface in step S22. When a result of the determination shows that the instruction target surface (the operation surface operated by the thumb) is the first input device 11, the CPU 21 performs processing by an application A12 under the control of the processing execution unit 215 in step S24.

On the other hand, when the result of the determination in step S22 shows that the instruction target surface (the operation surface operated by the thumb) is the second input device 12, the CPU 21 performs processing by an application A21 under the control of the processing execution unit 215 in step S23.

That is, when the "pinch control" has been performed as well, the different applications A12 and A21 are selected and performed as second processing depending on which of the first and second input devices 11 and 12 has been touched and operated by the thumb 41.

Effect

As described above, a determination is made as to whether a touch operation has been performed on one of the first and second input devices 11 and 12 or has been simultaneously performed on both the first and second input devices 11 and 12 (that is, the "pinch control" has been performed) according to an embodiment. Then, on the basis of a determination result, different processing is performed depending on whether the touch operation has been performed on only the first input device 11 or only the second input device 12.

For example, a case in which processing A1 and A2 to access different link destinations is performed depending on whether a touch operation has been performed on the first input device 11 or the second input device 12 even when the same software button (icon) has been specified by the touch operation is assumed.

In addition, when the "pinch control" has been performed, a determination is made as to whether a surface on which the touch operation has been performed by a thumb is on the side of the first input device 11 or the side of the second input device 12. Then, according to a determination result, different processing A12 and A21 is selected and performed depending on whether the surface on which the touch operation has been performed by the thumb is on the side of the first input device 11 or the side of the second input device 12. For example, as the processing A12 and A21, processing to read data downloaded and stored by the processing A1 and A2 from the data storage area of the memory 22 and display the read data is assumed.

Further, as another example, when a software button (icon) to activate a camera has been touched and operated on the side of the first input device 11, the execution of processing to capture a still image is assumed. Further, when the software button (icon) to activate the camera has been touched and operated by the "pinch control", the execution of processing to capture a moving image is assumed.

As described above, in an embodiment, the first and second input devices 11 and 12 are arranged on both the front and rear surfaces of the display device 13, a determination is made as to which of a touch operation on any one of the input devices 11 and 12 and the operation of simultaneously touching both the input devices 11 and 12, that is, the "pinch control" has been performed, and a plurality of different processing is selected and performed according to a combination of a determination result and a software button (icon) specified by the touch operation. Therefore, it is possible to selectively specify a multiplicity of types of processing without upsizing the input devices 11 and 12 and downsizing the display size of a software button (icon) or the like.

As a result, for example, by assigning a plurality of types of processing to one icon and changing the type of a touch operation on the first and second input devices 11 and 12, it is possible to selectively perform the plurality of types of processing although the one icon is specified.

That is, it is possible to selectively specify and perform a plurality of types of processing, while preventing the upsizing of a terminal apparatus or a reduction in operability.

Further, generally, the "pinch control" is performed by a thumb and another finger such as an index finger and a middle finger that is longer than the thumb, and an icon is specified by the thumb in many cases. Accordingly, in an embodiment, when the "pinch control" has been performed, a determination is made as to which of the first and second input devices serves as an input device to which operation instructions are to be input on the basis of a difference in the position coordinates of the touch operations of fingers on the respective input devices 11 and 12. Therefore, an input device to which operation instructions are to be input when the "pinch control" has been performed can be accurately determined.

Other Embodiments (1) When determining whether the "pinch control" has been performed, the input device determination unit 212 may compare the difference (xa, ya) between the position coordinates P1 of a touch operation on the first input device 11 and the position coordinates P2 of a touch operation on the second input device 12 with a prescribed threshold a and determine that the "pinch control" has been performed if the difference (xa, ya) between the position coordinates P1 and P2 is within the threshold α.

In this manner, for example, even if another hand or finger falsely touches the second input device 12 when a touch operation has been performed on the first input device 11, the touch operation on the first and second input devices 11 and 12 at this time can be prevented from being falsely determined as the "pinch control".

Figure 7:
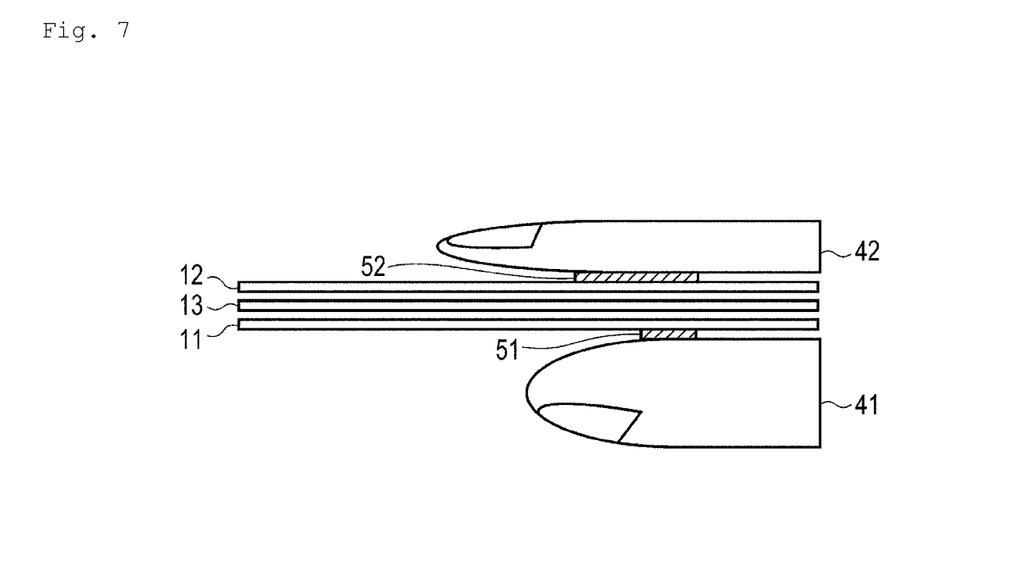
FIG. 7 is a side view showing an example of the contact state of fingers on the touch panel when the pinch control shown in FIG. 6 has been performed.
Figure 9:
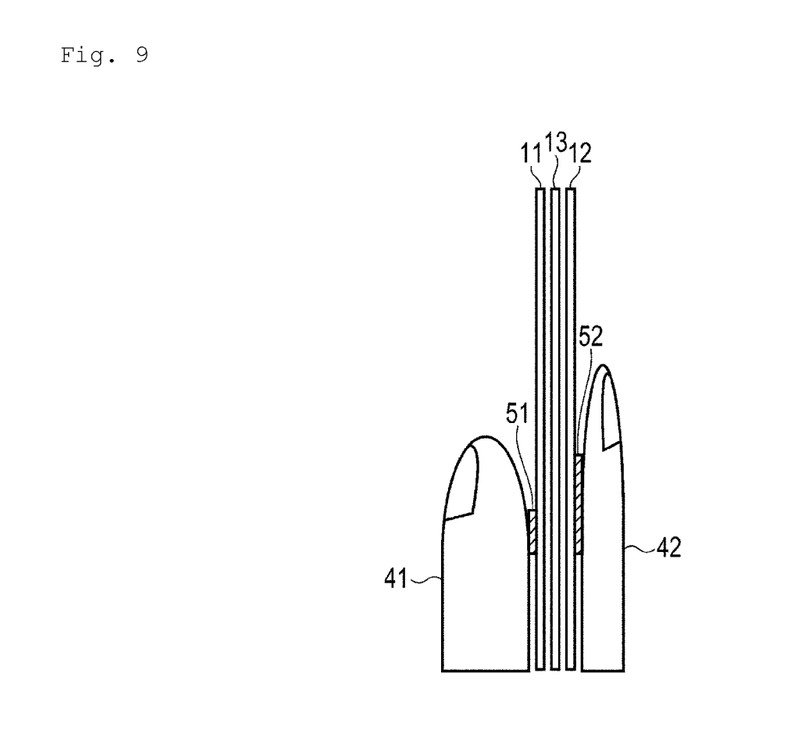
FIG. 9 is a side view showing an example of the contact state of fingers on the touch panel when the pinch control shown in FIG. 8 has been performed.

(2) When the "pinch control" has been performed by a thumb 41 and another finger 42, the contact area of the other finger 42 on the second input device 12 is generally larger than that of the thumb 41 on the first input device 11 as illustrated in, for example, FIGS. 7 and 9. Accordingly, the CPU 21 may determine a difference between the contact areas of the fingers on the respective input devices 11 and 12 on the basis of detection signals output from the first and second input devices 11 and 12 and determine which of the first and second input devices 11 and 12 has been touched and operated by the thumb 41, that is, which of the first and second input devices 11 and 12 has been used as an input device to which operation instructions are to be input on the basis of a determination result.

Further, the CPU 21 may determine a difference between contact shapes other than the difference between the contact areas and determine which of the first and second input devices 11 and 12 has been used as an input device to which operation instructions are to be input on the basis of a determination result.

Besides, the structure of the user interface unit 1, the materials of the display device 13 and the respective input devices 11 and 12, and the procedure and the processing contents of the information input processing in the terminal apparatus body may be deformed in various ways to be performed without departing from the gist of the present invention.

That is, the present invention is not limited to the above embodiments and may be deformed in various ways without departing from the gist in its execution stage. Further, the respective embodiments may be appropriately combined together as much as possible to be performed. In this case, combined effects are produced. In addition, the embodiments include the inventions of various stages, and various inventions can be extracted when a plurality of disclosed constituting elements are appropriately combined together.

REFERENCE SIGNS LIST

1 User interface unit
2 Terminal apparatus body
3 Signal line
11 First input device
12 Second input device
13 Display device
21 CPU
22 Memory
23 Wireless interface unit
41 Bus
41 Thumb
42 Another finger
211 Operation coordinate detection unit
212 Input device determination unit
213 Operation target surface determination unit
214 Instruction target recognition unit
215 Processing execution unit
221 Coordinate storage unit
222 Determination information storage unit
223 Display data storage unit
224 Recognition data storage unit

The invention claimed is:

1. A touch panel type information terminal apparatus comprising:
a display device that has a first surface and a second surface arranged on a rear surface side of the first surface;
a first input device that is arranged on the first surface of the display device and outputs a detection signal corresponding to a touch position according to a touch operation;
a second input device that is arranged on the second surface of the display device and outputs a detection signal corresponding to a touch position according to a touch operation; and
a terminal apparatus body that is connected to the display device, the first input device, and the second input device, wherein
the terminal apparatus body includes a hardware processor and a memory that stores at least a program performed by the hardware processor, and
the hardware processor is configured to
perform determination processing to determine whether the touch operation has been performed on only one of the first and second input devices or has been simultaneously performed on both the first and second input devices based on the respective detection signals output from the first and second input devices,
perform first processing based on the detection signal output from an input device on which the touch operation has been performed when determining that the touch operation has been performed on only one of the first and second input devices,
perform second processing based on the detection signal output from the first or second input device when determining that the touch operation has been simultaneously performed on both the first and second input devices,
determine which of the first and second input devices serves as an input device to which an instruction by the touch operation is to be input on the basis of the detection signals output from the first and second input devices when performing the second processing, and
select different processing on a basis of a determination result of the input device to which the instruction by the touch operation is to be input and the detection signals and perform the selected different processing as the second processing.

2. The touch panel type information terminal apparatus according to claim 1, wherein
the hardware processor is configured to
determine that the touch operation has been simultaneously performed on both the first and second input devices when a distance between a position of the touch operation in the first input device and a position of the touch operation in the second input device is within a prescribed threshold on the basis of the respective detection signals output from the first and second input devices in the determination processing.

3. The touch panel type information terminal apparatus according to claim 1, wherein, when determining the input device to which the instruction by the touch operation is to be input,
the hardware processor is configured to
select, from the first and second input devices, a device on which the touch operation has been performed at a position closer to an end of the device as the input device to which the instruction by the touch operation is to be input on the basis of the detection signals output from the first and second input devices.

4. The touch panel type information terminal apparatus according to claim 1, wherein, when determining the input device to which the instruction by the touch operation is to be input,
the hardware processor is configured to
determine at least one of a difference between areas of the touch operation and a difference between contact shapes of the touch operation on the first and second input devices on the basis of the detection signals output from the first and second input devices and determine the input device to which the instruction by the touch operation is to be input according to a determination result.

5. The touch panel type information terminal apparatus according to claim 1, wherein, when performing the first processing,
the hardware processor is configured to
select a plurality of different processing on a basis of identification information on an input device on which the touch operation has been performed and the detection signal output from the input device on which the touch operation has been performed and perform the selected processing as the first processing when determining that the touch operation has been performed on only one of the first and second input devices.

6. An information input processing method performed by a touch panel type information terminal apparatus including a display device that has a first surface and a second surface arranged on a rear surface side of the first surface, a first input device that is arranged on the first surface of the display device and outputs a detection signal corresponding to a touch position according to a touch operation, a second input device that is arranged on the second surface of the display device and outputs a detection signal corresponding to a touch position according to a touch operation, and a terminal apparatus body that is connected to the display device, the first input device, and the second input device, the terminal apparatus body including a hardware processor and a memory that stores at least a program performed by the hardware processor, the information input processing method comprising:

determining, by the hardware processor, whether the touch operation has been performed on only one of the first and second input devices or has been simultaneously performed on both the first and second input devices based on the respective detection signals output from the first and second input devices;

performing, by the hardware processor, first processing based on the detection signal output from an input device on which the touch operation has been performed when determining that the touch operation has been performed on only one of the first and second input devices;

performing, by the hardware processor, second processing based on the detection signal output from the first or second input device when determining that the touch operation has been simultaneously performed on both the first and second input devices;

determining, by the hardware processor, which of the first and second input devices serves as an input device to which an instruction by the touch operation is to be input on the basis of the detection signals output from the first and second input devices when performing the second processing, and     selecting, by the hardware processor, different processing on a basis of a determination result of the input device to which the instruction by the touch operation is to be input and the detection signals and perform the selected different processing as the second processing.

\* \* \* \* \*